Nov. 29, 1966   A. C. EISBRENNER   3,288,183
ELECTRIC DRILL ATTACHMENT
Filed Jan. 31, 1964   2 Sheets-Sheet 1
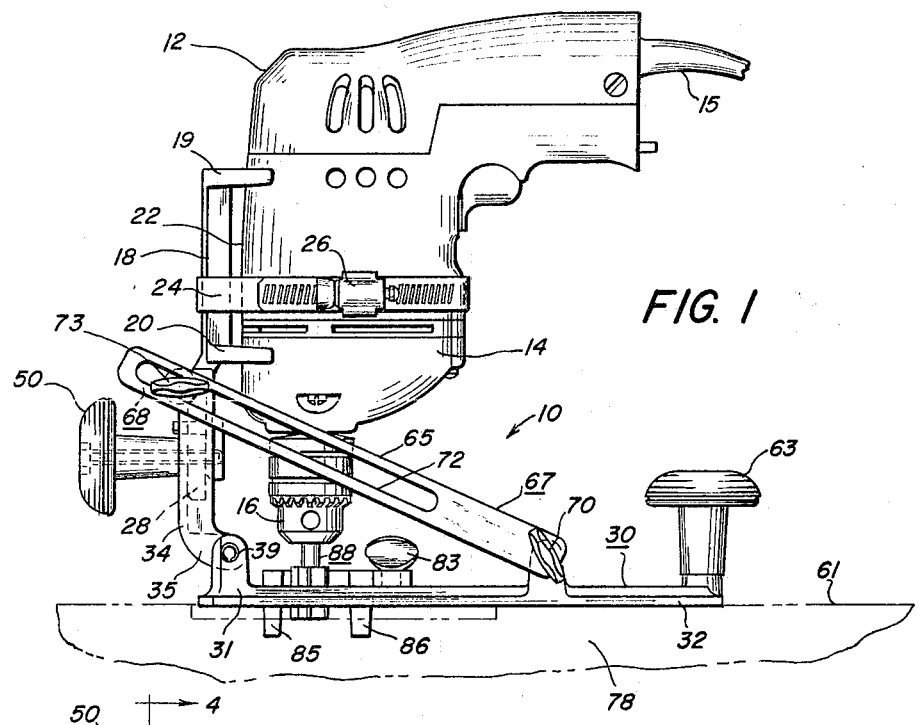
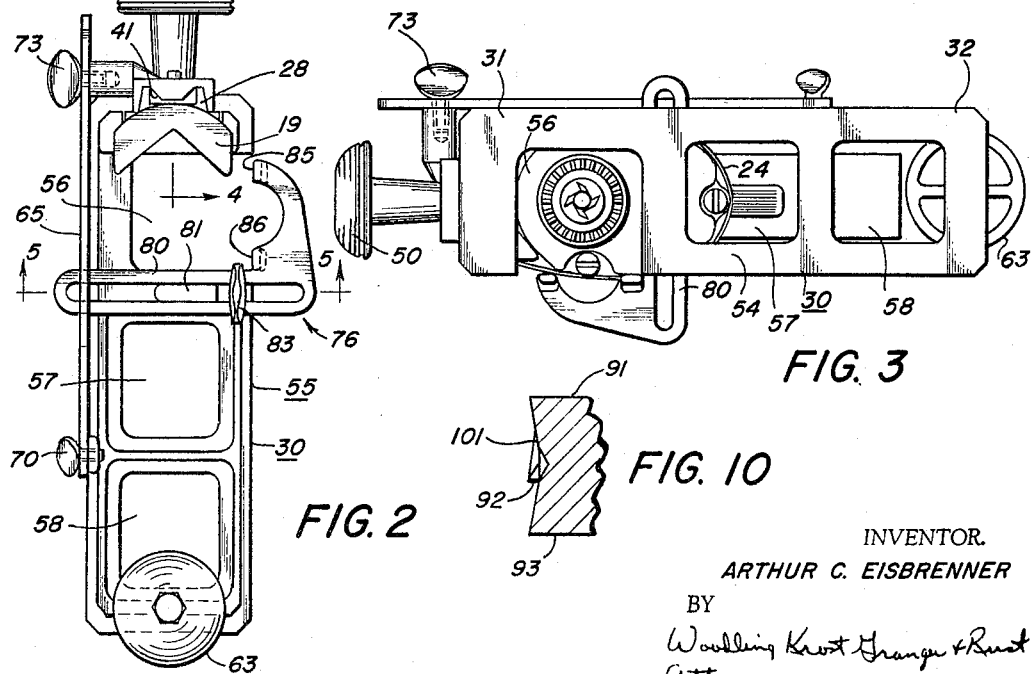
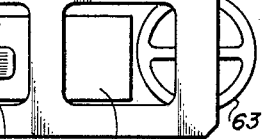
INVENTOR.
ARTHUR C. EISBRENNER
BY
Woodling Krost Granger & Rust
Attys.

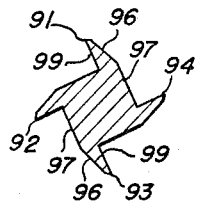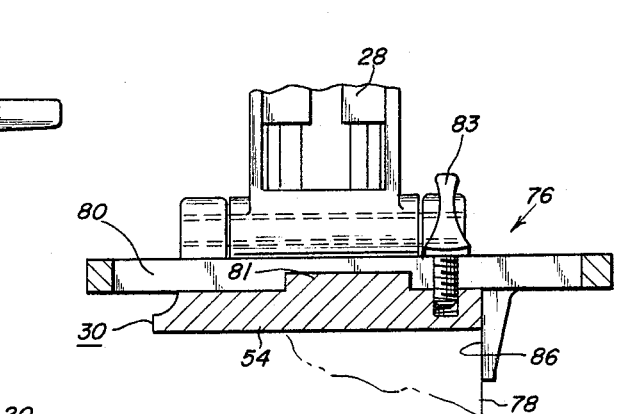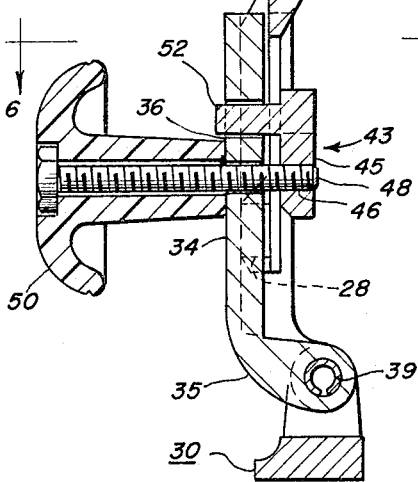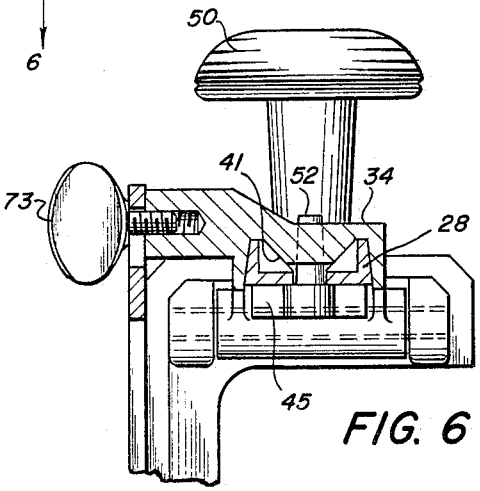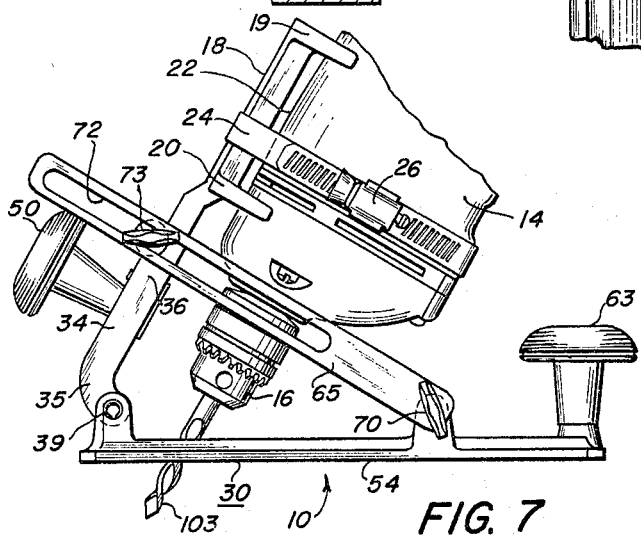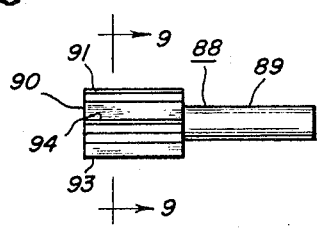
INVENTOR.
ARTHUR C. EISBRENNER United States Patent Office 3,288,183
Patented Nov. 29, 1966

3,288,183
ELECTRIC DRILL ATTACHMENT
Arthur C. Eisbrenner, Walrath Circle,
North Kingsville, Ohio
Filed Jan. 31, 1964, Ser. No. 341,496
3 Claims. (Cl. 144—136)

The present invention relates in general to an attachment for a portable electric hand drill which enables the device to be converted to a router as well as other uses set forth hereinafter.

One of the purposes of the present invention is to provide an attachment for a portable electric drill which may be utilized for the use of a router bit in the drill to uniformly remove wood or any other material normally cut with woodworking tools, in most instances from a surface in a plane parallel to the original surface and to be able to do this to a desired depth with controlled accuracy.

An object of the present invention is to provide an inexpensive attachment or holding fixture to locate a hand drill unit in a generally vertical position whereby the same may be converted to a router by the use of a router bit in the drill chuck.

Another object of the present invention is to provide an attachment for a power drill unit which enables the spindle of the drill to be located at various angular positions relative to a surface upon which work is to be performed.

Another object of the present invention is to provide an attachment for a power drill unit which will enable a predetermined desired depth of cut to be made in a workpiece.

Another object of the present invention is to provide a quick and convenient means of connecting the attachment of the present invention to a power drill unit.

Another object of the present invention is to provide an attachment guide whereby the attachment may be moved conveniently in a direction parallel to a guide edge.

Other objects and a fuller understanding of this invention may be had by referring to the following description and claims, taken in conjunction with the accompanying drawings, in which:

FIGURE 1 is a side elevational view of the attachment of the present invention associated with a portable electric drill;

FIGURE 2 is a plan view of the attachment of the present invention without the electric drill;

FIGURE 3 is a bottom view of the attachment shown in FIGURE 1;

FIGURE 4 is a view taken generally along the line 4—4 of FIGURE 2;

FIGURE 5 is a fragmentary view taken generally along the line 5—5 of FIGURE 2;

FIGURE 6 is a view taken generally along the line 6—6 of FIGURE 4;

FIGURE 7 is a fragmentary view similar to FIGURE 1 and illustrating how the attachment may be utilized to hold the electric drill at an angle so that holes may be drilled at an angle in a workpiece;

FIGURE 8 is a side elevational view of a router bit of the present invention;

FIGURE 9 is a view taken generally along the line 9—9 of FIGURE 8; and,

FIGURE 10 is an enlarged fragmentary view in cross section showing in more detail the left end of the tool shown in FIGURE 8.

The attachment of the present invention as illustrated in the accompanying drawings is indicated generally by the reference numeral 10 and is adapted for use with a conventional electric hand drill 12 which comprises a housing 14, power cable 15 and a chuck 16. The attachment 10 comprises a support bracket 18 which has first and second spaced generally V-shaped wall portions 19 and 20 with the V portions adapted for engagement with what will be referred to as the back 22 of the drill housing 14. The support bracket is secured to the back 22 of the drill housing by means of a clamping band 24 which, as will be noted particularly in FIGURES 1 and 7, extends around the drill housing in engagement with the support bracket and the ends of the band are secured by a mechanism 26 which permits the length of the clamping band 24 to be adjusted and as a result regulates the looseness and tightness of the same.

A guide extension 28 extends down from and is integral with the support bracket 18. A base member 30 is provided which has first and second end portions 31 and 32, respectively, and as seen in FIGURE 1 the base is located approximately at a 90 degree angle with respect to the spindle of the electric drill. The present attachment provides for angular adjustment between these two members as will be described hereinafter and as is illustrated in FIGURE 7. A connecting member 34 is also provided which has first and second end portions 35 and 36, respectively, and a pivot hinge 39 serves to pivotally connect the first end portion 31 of the base member to the first end portion 35 of the connecting member. Wall means 41 are provided in the second end portion of the connecting member and serve to define a guideway within which the guide extension 28 resides and this permits for adjusting the longitudinal position of the connecting member 34 and guide extension 28 with respect to each other which accordingly results in a longitudinal adjustment of the base member 30 with respect to the hand drill.

A clamping mechanism 43 is provided for holding the guide extension and connecting member in a fixed position relative to each other when this position has been predetermined by an operator and until it be desired that the adjustment be changed. This clamping mechanism 43 includes a block member 45, see FIGURES 4 and 6, which has a threaded opening 46 and is engageable with the guide extension 28. A threaded bolt 48 extends axially through a handle 50 through an elongated slot in the guide extension 28 and into the threaded opening 46. The block member 45 has a guide pin 52 which also extends through the slot in the guide extension and through an opening in the connecting member 34 to properly align the block member. As a result of this construction, it will be readily appreciated that upon turning of the handle 50 and as a result the bolt 48, in a desired direction that the block member will be drawn toward the handle, and as a result the guide extension and connecting member will be squeezed together and held in a fixed position. Upon turning of the bolt 48 in the opposite direction, the reverse will result and the two elements will be loosened so that longitudinal adjustment may be accomplished. In addition to longitudinal adjustment, the attachment from the connecting member 34 on down may be completely removed leaving only the support bracket 18 which includes the guide extension 28 attached to the housing of the drill by means of the clamping band 24.

The base member 30 as will be seen in most of the drawings is provided with a generally flat bottom surface 54 and has wall means 55 which form window-like effects identified by the reference numerals 56, 57, and 58 and the direction through these windows is generally normal to the flat bottom surface 54 of the base. Referring specifically to FIGURES 2 and 3, a portion of the wall means 55 in the window 56 has been cut away to provide for the free escape of chips cut by a tool 88 held in the chuck 16 of the drill 12. In other words, after the attachment is slid along a surface, for example 61 shown in FIGURE 1, and the tool 88 removes material from the surface 61 of the workpiece, the chips removed will be able to freely escape from this particular window. Another handle 63 is provided on the second end portion of the base and in combination with the handle 50 enables an operator of the device to conveniently move the attachment and associated power drill unit along a work surface. A securing link 65 is provided for adjustably locating the angular position of the base member 30 relative to the connecting member 34 and as a result angularly with respect to the drill 12 and its spindle. The securing link comprises first and second end portions 67 and 68, respectively, and first pivot means 70 serve to connect the first end portion of the securing link to the base. Wall means 72 serve to define a slot in the second end portion 68 of the securing link. A lock screw 73 extends through the slot and into a cooperating threaded opening in the guide extension and when tightened, serves to fix the angular position of the base relative to the connecting member.

An attachment guide 76 is provided for moving the attachment 10 parallel to a given guide surface 78 (see FIGURES 1 and 5). The attachment guide includes a slotted arm 80 with the slot in the arm adapted to fit over and be guided by a projection 81 formed as an integral part of the base member 30. The arm can be adjusted laterally of the base (see FIGURE 2) within the limits of the slotted arm and projection 81. When the attachment guide has been adjusted to the desired position, it may be fixed in this position by means of a clamping screw 83. First and second spaced attachment guide surfaces 85 and 86, respectively, form a part of the attachment guide and are positioned generally parallel to the extent of the base and these guide surfaces are adapted to engage a given guide surface such as 78 to guide the movement of the attachment. One of the primary uses of the attachment is to perform what is generally called a routing function and this is performed by the use of a router cutter 88 as shown in FIGURES 1 and 3 of the drawings and in more detail in FIGURES 8 and 9. The router cutter 88 includes a shank portion 89 which is held in the chuck 16 and a cutting portion 90 which includes cutting edges 91 through 94. These cutting edges extend in a direction which is generally parallel to the axis of the router cutter and each cutting edge is defined by first and second back-off surfaces 96 and 97, respectively, and the forward portion of the cutting edge being defined by a forward surface 99 which extends at nearly a radius to the cutting portion of the router cutter. The extreme axial end surface of the cutting portion 90 is on the order of a concave or conical surface 101 which serves to make each of the cutting edges 91 through 94 extend further axially than any other point on the router cutter. This particular type of router cutter has produced better results than conventional router cutters available on the market.

FIGURE 7 illustrates the angular adjustment feature of the attachment which enables the power drill and the spindle thereof to be located at an angle with respect to the base of the attachment and as a result at an angle to a surface upon which work is to be performed. In FIGURE 7, there has been shown a drill 103 held by the chuck 16 of the power drill and this demonstrates how holes can be produced in a surface at a desired angle. When using the device in this manner, of course, it is necessary to loosen the clamping mechanism 43 so that the guide extension 28 can be moved in the guideway 41 of the connecting member 34 in a longitudinal manner so as to produce the drilled holes.

As a result of the attachment of the present invention, it will be readily recognized by those skilled in the art that an attachment has been provided whereby the conventional electric drill can be conveniently converted to a router for performing many functions such as cutting grooves, such as mortising for shelves, drawers, tongue and groove joints, and grooving for ornamental work in door and drawer fronts, as well as paneling. The device may also be used in mortising for door hinges and locks and with the aid of a guide or straight edge, old putty can be removed from around windows. With a router cutter or a rotary saw bit, the unit can also be used for cutting openings, such as in paneling, for electrical outlets.

The use of the support bracket 18 herein described and disclosed, provides a quick and easy means of attaching and detaching the mechanism to the electric drill. In other words, the support bracket may remain on the drill at all times for the normal use of the same and the remainder of the attachment may be quickly and readily removed by simply unscrewing the threaded bolt 48 by means of the handle 50. It will also be appreciated that the shape of the housing 14 and particularly the back of the housing 22 on many drills varies somewhat. By use of the pivot hinge 39 which connects the base member 30 and the connecting member 34, as well as the use of the securing link, the base member may be conveniently located at right angles to the spindle of the drill. The longitudinal means of adjustment between the guide extension and the connecting member also provides a ready means of predetermining the depth of cut which is to be taken by the tool held in the chuck of the drill.

With the use of a tool such as the drill 103 in the chuck 16, the device can be used to drill holes at desired angles and also at desired depths. When router cutter 88 is being used in the device to perform a routing function, the attachment guide 76 enables the device to be conveniently guided along a guide surface. The attachment guide can be readily removed by removing the clamping screw 83 when the atachment guide is not desired. The attachment guide can be stored in the same position by merely turning it over so that the guide surfaces 85 and 86 project upwardly in the direction opposite to that shown in FIGURE 1.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A universal attachment for a hand drill which has a housing including in combination a support bracket having first and second spaced generally V-shaped wall portions for engagement with the drill housing, a clamping band engageable with said support bracket between said first and second V-shaped wall portions and adapted to extend around the drill housing to hold said support bracket in position, a guide extension extending from and integral with said support bracket, a base member having first and second end portions, a pivot hinge at said first end portion of said base, a connecting member having first and second end portions, said pivot hinge pivotally connecting said first end portion of said base member to said first end portion of said connecting member, wall means defining a guideway in said second end portion of said connecting member, said guide extension residing in said guideway and permitting longitudinal adjustment of said base relative to a hand drill, a clamping mechanism for holding said guide extension and connecting member in a fixed position relative to each other and comprising a block member having a threaded opening and engageable with said guide extension, a threaded member residing in said threaded opening and engageable with said connecting member whereby said guide extension and connecting member may be squeezed together, a handle connected to said threaded member, said base member having a generally flat bottom surface and having wall means defining a plurality of window-like effects in a direction normal to said flat bottom surface, a portion of said wall means defining one of said window-like effects being cut away at said first end portion of said base to provide for the free escape of chips cut by a tool in the drill, a handle on said second end portion of said base, a securing link for adjustably locating the angular position of said base relative to said connecting member and to a drill to which the connecting member is adapted to be attached, said securing link comprising first and second end portions, first pivot means connecting said first end portion of said securing link to said base, wall means defining a slot in said second end portion of said securing link, a lock screw extending through said slot and into a cooperating threaded opening in said connecting member to fix the position of said base, an attachment guide for moving said attachment parallel to a given guide surface, said attachment guide comprising an arm secured to said base and extending in a direction generally transverse to said base, first and second spaced attachment guide surfaces generally parallel to the extent of said base and adapted to engage a given guide surface to movement of said attachment.

2. An attachment for a hand drill which has a housing including in combination a support bracket having first and second spaced wall portions for engagement with the drill housing, a clamping band engageable with said support bracket and adapted to extend around the drill housing to hold said support bracket in position, a guide extension extending from and integral with said support bracket, a base member having first and second end portions, a pivot hinge at said first end portion of said base, a connecting member having first and second end portions, said pivot hinge pivotally connecting said first end portion of said base member to said first end portion of said connecting member, wall means defining a guideway in said second end portion of said connecting member, said guide extension residing in said guideway and permitting longitudinal adjustment of said base relative to a hand drill, a clamping mechanism for holding said guide extension and connecting member in a fixed position relative to each other, a handle on said second end portion of said base, a securing link for adjustably locating the angular position of said base relative to said connecting member and to a drill to which the connecting member is adapted to be attached, said securing link comprising first and second end portions, first pivot means connecting said first end portion of said securing link to said base, wall means defining a slot in said second end portion of said securing link, a lock member extending through said slot and into a cooperating opening in said connecting member to fix the position of said base, an attachment guide for moving said attachment parallel to a given guide surface, said attachment guide comprising an arm secured to said base and extending in a direction generally transverse to said base, attachment guide surface means generally parallel to the extent of said base and adapted to engage a given guide surface to guide movement of said attachment.

3. An attachment for a hand drill which has a housing including in combination a support bracket having first and second spaced wall portions for engagement with the drill housing, a clamping band engageable with said support bracket and adapted to extend around the drill housing to hold said support bracket in position, a guide extension extending from and integral with said support bracket, a base member having first and second end portions, a pivot hinge at said first end portion of said base, a connecting member having first and second end portions, said pivot hinge pivotally connecting said first end portion of said base member to said first end portion of said connecting member, wall means defining a guideway in said second end portion of said connecting member, said guide extension residing in said guideway and permitting longitudinal adjustment of said base relative to a hand drill, a clamping mechanism for holding said guide extension and connecting member in a fixed position relative to each other, a securing link for adjustably locating the angular position of said base relative to said connecting member and to a drill to which the connecting member is adapted to be attached, said securing link comprising first and second end portions, first pivot means connecting said first end portion of said securing link to said base, wall means defining a slot in said second end portion of said securing link, and a lock member extending through said slot and into a cooperating opening in said connecting member to fix the position of said base.

References Cited by the Examiner
UNITED STATES PATENTS

| 1,359,765 | 11/1920 | Stelmach | 144—240 |
| 1,630,830 | 5/1927 | Carter | 144—240 |
| 2,805,691 | 9/1957 | Medal | 144—1 |
| 2,888,965 | 6/1959 | Phillips | 144—1 |
| 2,953,045 | 9/1960 | Carles | 77—7 |

DONALD R. SCHRAN, *Primary Examiner.*